US009996607B2

(12) United States Patent
Alexe et al.

(10) Patent No.: US 9,996,607 B2
(45) Date of Patent: Jun. 12, 2018

(54) ENTITY RESOLUTION BETWEEN DATASETS

(71) Applicant: International Business Machines Corporation, Armonk, NY (US)

(72) Inventors: Bogdan Alexe, San Jose, CA (US); Douglas R. Burdick, San Jose, CA (US); Mauricio A. Hernandez-Sherrington, Gilroy, CA (US); Hima P. Karanam, Hyderabad (IN); Rajasekar Krishnamurthy, Campbell, CA (US); Lucian Popa, San Jose, CA (US); Shivakumar Vaithyanathan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 687 days.

(21) Appl. No.: 14/529,585

(22) Filed: Oct. 31, 2014

(65) Prior Publication Data

US 2016/0125067 A1 May 5, 2016

(51) Int. Cl.
*G06F 7/00* (2006.01)
*G06F 17/00* (2006.01)
(Continued)

(52) U.S. Cl.
CPC .... *G06F 17/30604* (2013.01); *G06F 17/3053* (2013.01); *G06F 17/30566* (2013.01)

(58) Field of Classification Search
CPC ......... G06F 17/30566; G06F 17/30604; G06F 17/3053
(Continued)

(56) References Cited

U.S. PATENT DOCUMENTS

2006/0294151 A1* 12/2006 Wong ................ G06F 17/30557
707/999.2
2010/0161542 A1 6/2010 Caceres
(Continued)

OTHER PUBLICATIONS

Benjamin Bengfort, "Entity Resolution for Big Data." Data Community DC, World Wide Web http://www.datacommunitydc.org/blog/2013/08/entity-resolution-for-big-data, Aug. 13, 2013 [accessed Mar. 3, 2017].*

(Continued)

*Primary Examiner* — Usmaan Saeed
*Assistant Examiner* — Brian E. Weinrich
(74) *Attorney, Agent, or Firm* — Cantor Colburn LLP (57) ABSTRACT

Described herein are methods, systems and computer program products for entity resolution. Entity resolution, also known as entity matching or record linkage, seeks to identify equivalent data objects between or among datasets. An example method includes creating a deterministic model by defining an entity to be resolved, selecting two datasets for comparison, defining matching predicates for attributes of the datasets to select a set of candidate matches, and defining a precedence rule for the candidate matches to select a subset of the candidate matches. The method includes running the deterministic model on the two datasets. Running the deterministic model includes applying the matching predicates and the precedence rule to data in the datasets that correspond to the attributes. The method also includes applying a cardinality rule to results of the running, and outputting the matching candidates for which the cardinality rule is satisfied.

17 Claims, 8 Drawing Sheets

(51) Int. Cl.
*G06F 17/30* (2006.01)
*G06F 15/16* (2006.01)

(58) Field of Classification Search
USPC .......................................................... 707/603
See application file for complete search history.

(56) References Cited

U.S. PATENT DOCUMENTS

| | | | | |
|---|---|---|---|---|
| 2010/0161602 A1* | 6/2010 | Caceres | ............ | G06F 17/30539 |
| | | | | 707/736 |
| 2010/0161662 A1* | 6/2010 | Jonas | ................ | G06F 17/30539 |
| | | | | 707/780 |
| 2011/0246494 A1* | 10/2011 | Adair | ................ | G06F 17/30241 |
| | | | | 707/758 |
| 2012/0095957 A1* | 4/2012 | Reddy | ............... | G06F 17/30566 |
| | | | | 707/602 |
| 2013/0031089 A1 | 1/2013 | Allen et al. | | |
| 2013/0204886 A1* | 8/2013 | Faith | ...................... | G06Q 50/01 |
| | | | | 707/756 |
| 2013/0304576 A1* | 11/2013 | Berland | ................ | G06Q 50/01 |
| | | | | 705/14.53 |
| 2013/0339141 A1* | 12/2013 | Stibel | .................... | G06Q 50/01 |
| | | | | 705/14.49 |
| 2014/0046653 A1* | 2/2014 | Gopalakrishnan | ........................ | G06F 17/30604 |
| | | | | 704/9 |
| 2014/0101172 A1* | 4/2014 | Dua | .................. | G06F 17/30557 |
| | | | | 707/750 |
| 2014/0358932 A1* | 12/2014 | Brown | ............. | G06F 17/30445 |
| | | | | 707/741 |
| 2015/0066851 A1* | 3/2015 | Henderson | ........ | G06F 17/30604 |
| | | | | 707/624 |
| 2015/0120679 A1* | 4/2015 | Borean | .................. | G06Q 50/01 |
| | | | | 707/690 |

OTHER PUBLICATIONS

Internet Society et al., "Issues in Identifier Comparison for Security Purposes," IP.com No. IPCOM000227650D, May 10, 2013, 53 pages.

IP.com, "System and Method to Improve the Performance of the Candidate List Generation Process of an Entity Analytics System Using In-Memory, Read-Only, Cache," IP.com No. IPCOM000212210D, Nov. 4, 2011, 20 pages.

Sismanis et al., "Resolution-aware query answering for business intelligence," AN-10571583, 2009, 1 page.

\* cited by examiner

400 create link TW_Customer as
select [ twID: T.userid,  custID:  C.PROFILE_ID] ⎯ 402
from TWProfiles T, CustomerData C, T.geos geoTag ⎯ 404 match using
    T.lastName = C.lastName and
    lastNameFrequencyFilter(C.lastName, 20) and  ⎬ Matching Predicates 406
    firstNameMatch(T.firstName, C.firstNames) and
    isGeoNearZipCode(geoTag, C.zipGeo, 5)

⎯ Precedence Rule 408
group on twID
    keep links having
        domainMatch (C.email, T.urls)

cardinality twID 1:1 custID; ⎯ 410

502 — Insert into MDMRecordsWithDerivedData
select [ rcd:r, derived: deriveData(r)
from MDMRecords r;
. . .
create link ScoredMatches as
select [ id1: r1.MEMHEAD, id2: r2.MEMHEAD ]
from MDMRecordsWithDerivedDataAndBucket r1,
MDMRecordsWithDerivedDataAndBucket r2
504 — block r1 on bucket,
r2 on bucket
506 — score using rule1: binaryCompare( r1, r2 )
check SCORES.rule1 > 100;

ENTITY RESOLUTION BETWEEN DATASETS

BACKGROUND

The present disclosure relates generally to data analytics, and more specifically, to entity resolution between datasets.

Currently, entity resolution techniques compare data between traditional data sources, e.g., those in which the data is structured and includes strong identifying attributes. The resolution performs pairwise matching of data between the sources to determine candidate matches. If the datasets contain missing values, the process is often repeated.

The resulting data is disambiguated by a data steward who is employed to build entity groups from the pairwise comparisons. Decisions are then made on the cumulative evidence resulting from the disambiguation.

SUMMARY

Embodiments include a method, system, and computer program product for entity resolution. The method includes creating, via a computer processor, a deterministic model. The creating includes defining an entity to be resolved, selecting two datasets for comparison, defining matching predicates for attributes of the datasets to select a set of candidate matches, and applying a precedence rule for the candidate matches to select a subset of the candidate matches. The method further includes running, via the computer processor, the deterministic model on the two datasets. The running includes applying the matching predicates and precedence rule to data in the datasets that correspond to the attributes. The method also includes applying a cardinality rule to results of the running, and outputting the matching candidates for which the cardinality rule is satisfied.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Entity resolution, also known as entity matching or record linkage, seeks to identify equivalent data objects between or among datasets. For example, entity resolution seeks to identify records in multiple databases that refer to the same real world entity (e.g., individuals, companies, products). Entity resolution can be challenging, particularly when applied to big data and/or when working with non-traditional datasets (e.g., datasets lacking strong identifying attributes).

A traditional dataset is typically structured data (e.g., a relational database or table) with defined fields for stored data values. A traditional dataset is curated and is easily searchable through queries due to its defined structure and strong identifying attributes (e.g., customer lists, employee databases, transaction records). By contrast, a non-traditional dataset may be data that is unstructured or semi-structured. An example of a non-traditional dataset may be a social media profile and media activity.

The exemplary entity resolution processes described herein provide entity resolution between traditional and non-traditional datasets, as well as between non-traditional datasets. The entity resolution processes utilize multiple algorithms, each using different subsets of available attributes, and each implemented using either deterministic or probabilistic techniques. The combination of multiple techniques, in conjunction with disambiguation methods (e.g., enforcing 1:1 constraints), can lead to increased accuracy and recall.

Figure 1:
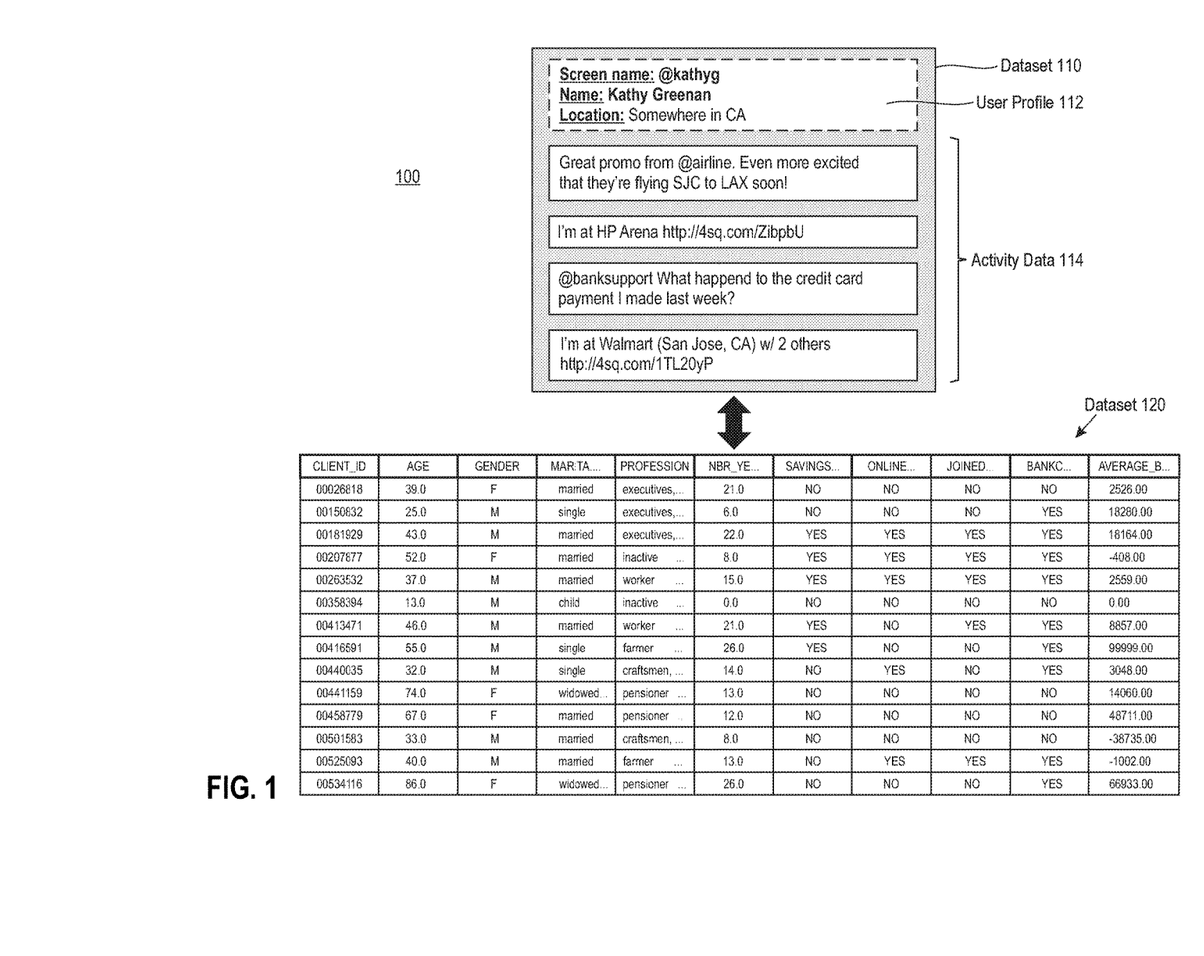
FIG. 1 depicts an entity resolution scenario for non-traditional datasets.

FIG. 1 is a diagram 100 depicting two datasets 110 and 120. Dataset 110 represents a user profile 112 and corresponding activity data 114 for a user of an online social media network. The user profile 112 and activity data 114 reflect a non-traditional dataset. Dataset 120 represents a customer database or table whereby each record in the table corresponds to a customer. In one embodiment, an enterprise managing the customer database 120 may desire to know whether the entity associated with the profile 112 is one of its customers. This information may enable the enterprise to provide improved and more personalized marketing to its customers, as well as provide a better understanding of customer feedback on products and services.

Figure 2:
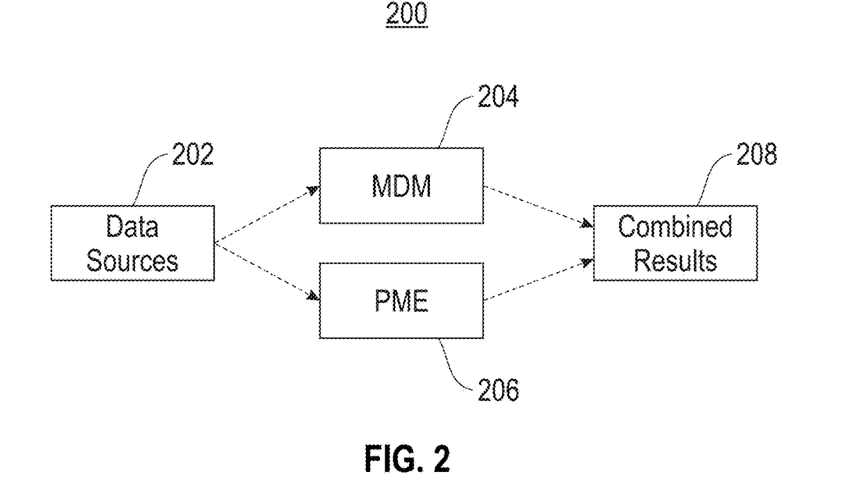
FIG. 2 depicts a system for entity resolution between non-traditional datasets in accordance with an embodiment.

With reference now to FIG. 2, a block diagram of a system 200 for entity resolution between datasets (e.g., databases 110 and 120) is shown. Data sources 202 may be any type of structured and/or unstructured data, and may include proprietary, public, and/or semi-private data (e.g., an individual or entity enables limited access to online data and databases). In an embodiment, various types of data from the data sources may be used to implement the entity resolution processes described herein. For example, the data can provide relationship clues (e.g., customer-of or employee-of signals expressed by users in social media), as well as location evidence at multiple granularities (e.g., geo-coordinates, zipcode, city, state) and with different semantics (e.g., home, work, temporary). In addition, the data can provide online presence indicators, such as social media handles, email addresses, and URL links.

The datasets 110 and 120 of FIG. 1 may be accessed from any of the data sources 202.

The system 200 also includes a master data management engine (MDM) 204 that creates deterministic models used in performing entity resolution functions as described herein. In addition, the system 200 includes a probabilistic matching engine (PME) 206 that creates probabilistic models used in conjunction with the deterministic models to provide entity resolution between datasets, as described herein.

A deterministic model is created by the MDM 204, and a probabilistic model 206 is created by the PME 206. These models may be created simultaneously or in sequence. In an embodiment, the models may be applied to different subsets of the datasets. As shown in FIG. 2, datasets are accessed by both the MDM 204 and PME 206, and the datasets are processed by the models (simultaneously or in sequence) to provide entity resolution between the datasets. The results of the models are combined, as shown at 208 (e.g., a union of the two sets of results).

Figure 3A:
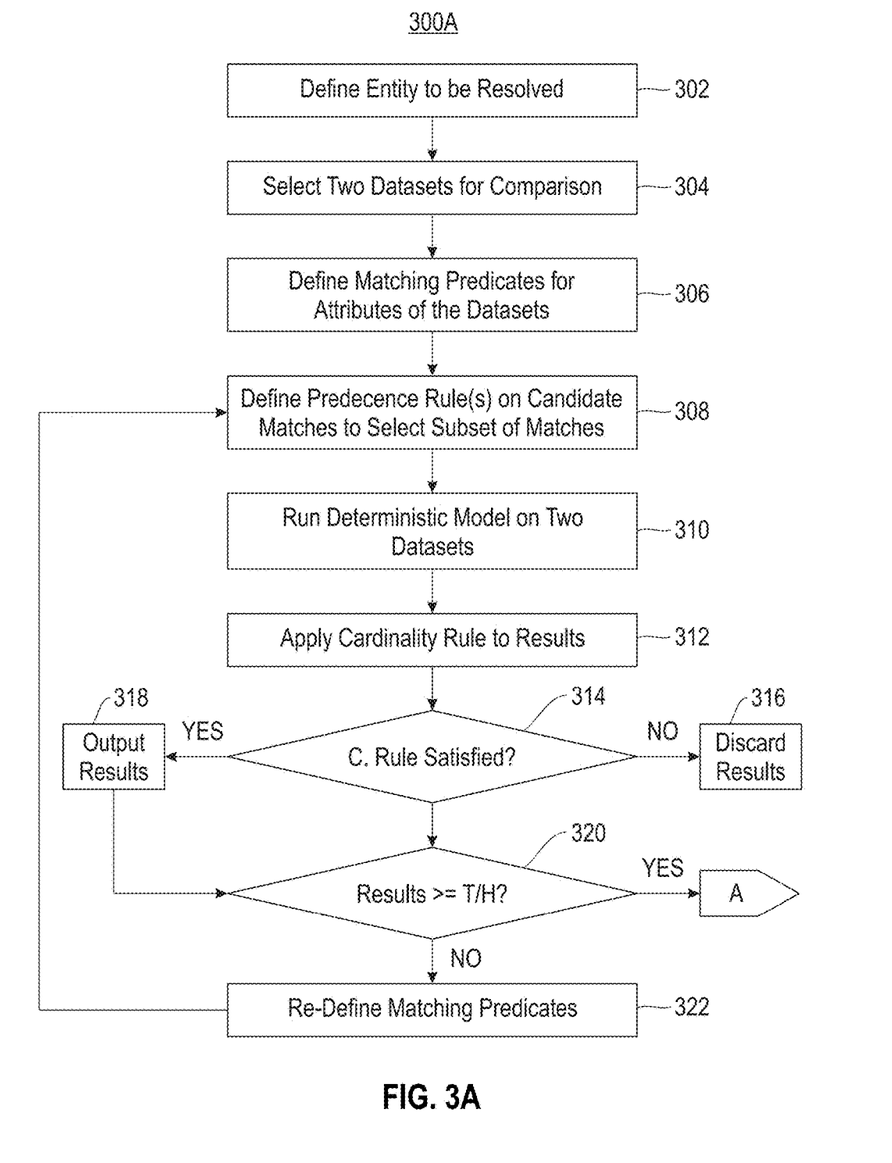
FIGS. 3A-3B depict a process flow for creating and deploying a deterministic model and a probabilistic model for entity resolution between non-traditional datasets in accordance with an embodiment.
Figure 3B:
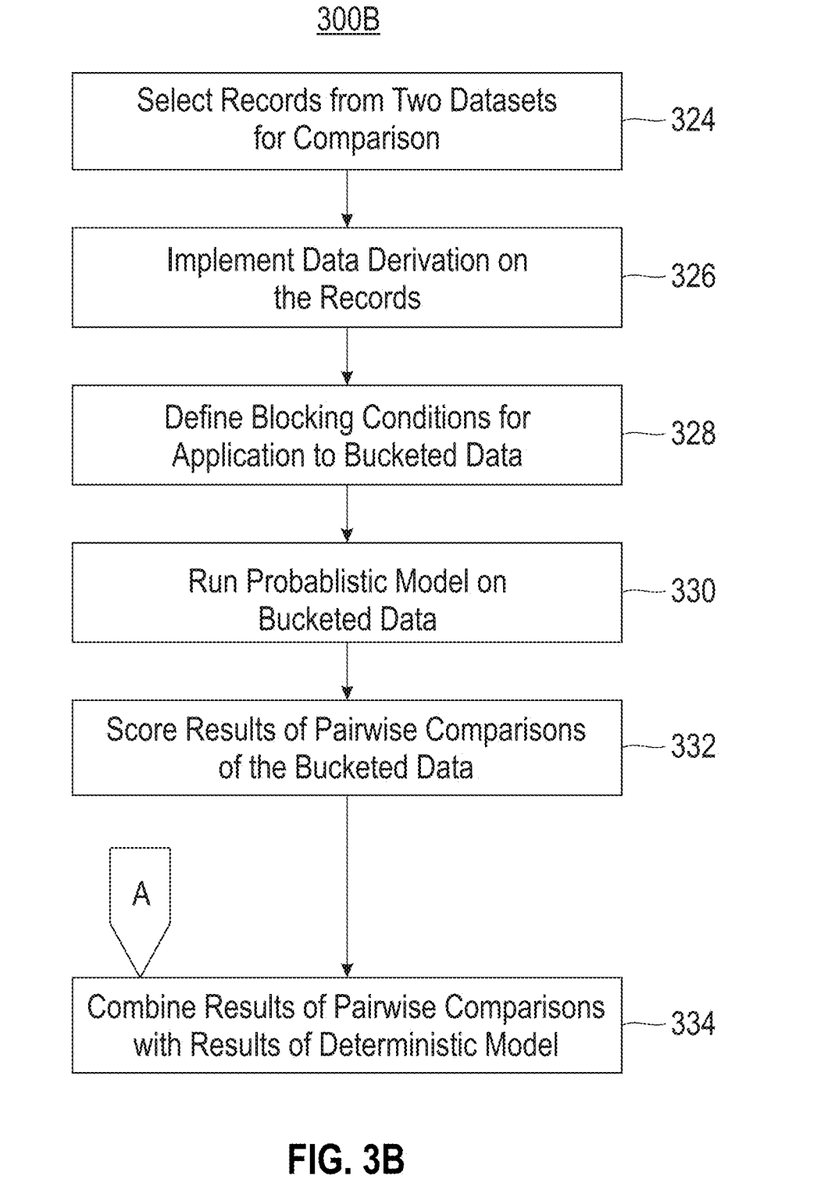
Figure 4:
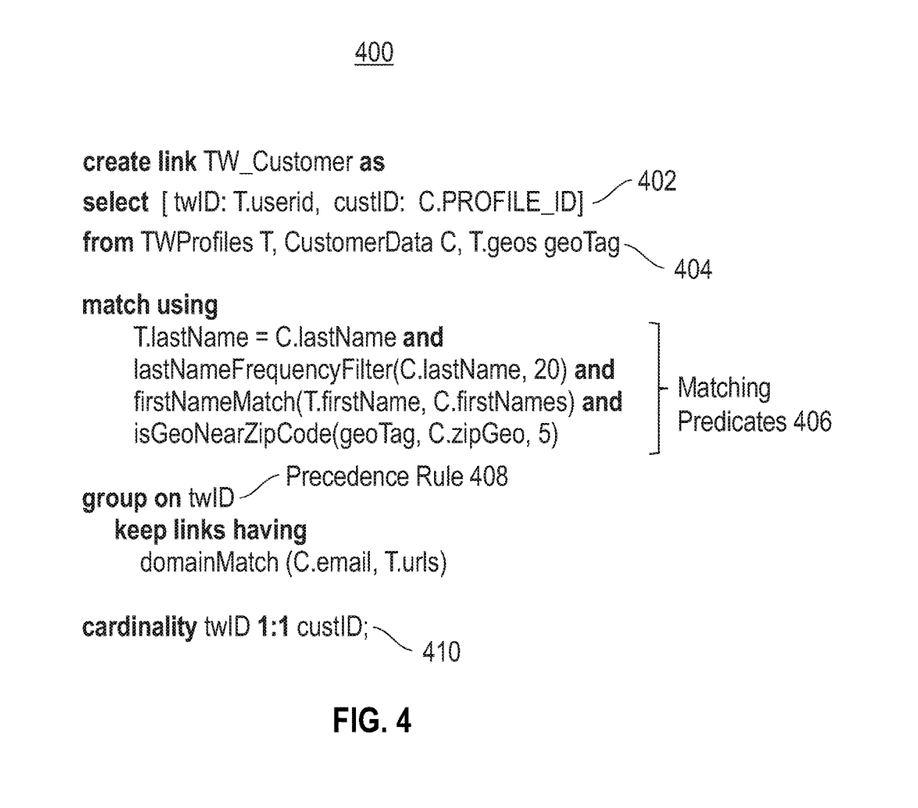
FIG. 4 depicts an algorithm for a sample deterministic model expressed in High-Level Integration Language (HIL) in accordance with an embodiment.
Figure 5:
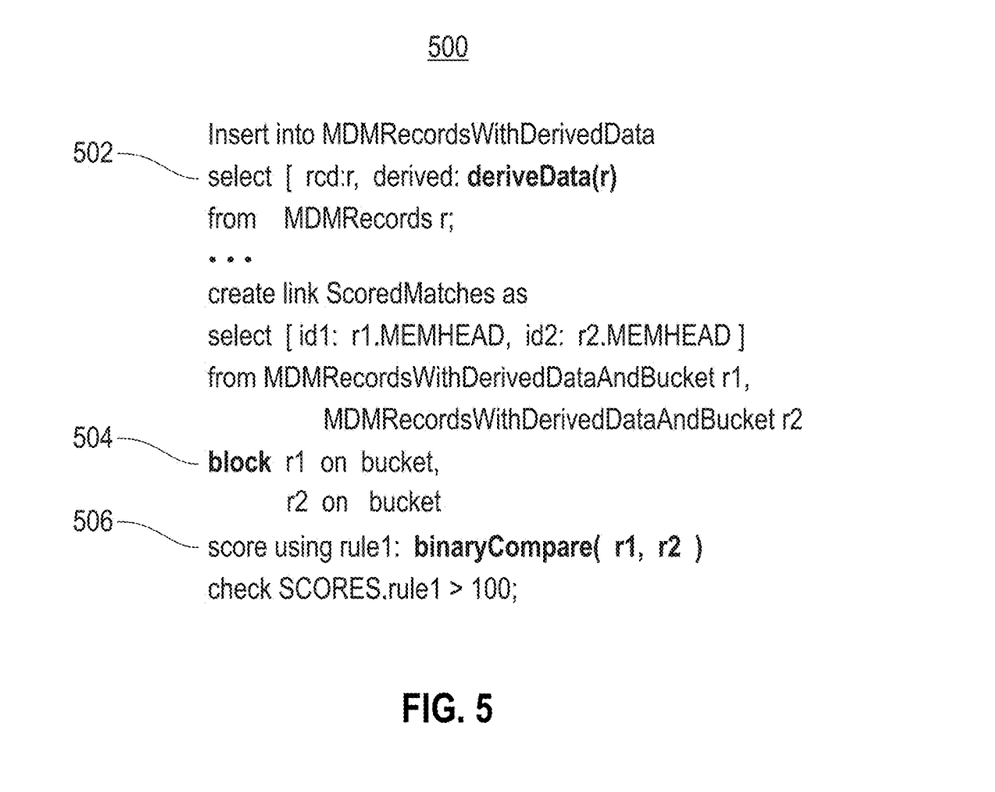
FIG. 5 depicts an algorithm for a sample probabilistic model expressed in HIL in accordance with an embodiment.

Referring now to FIGS. 3A-3B, a process flow of a method 300A-300B for entity resolution in accordance with an embodiment is illustrated. FIGS. 3A-3B are further described in reference to FIGS. 4 and 5. In FIG. 3A, a deterministic model is created and executed, and in FIG. 3B, a probabilistic model is created and executed. An algorithm 400 for creating and implementing the deterministic model is shown in FIG. 4. The algorithm 400 is expressed in High-Level Integration Language (HIL) for illustrative purposes. An algorithm 500 for creating and implementing the probabilistic model is shown in FIG. 5. The algorithm 500 is also expressed in HIL.

The method 300A-300B is described, by way of illustration, as occurring in sequence in which the deterministic model is first created and executed followed by the probabilistic model. It will be understood by one skilled in the art that the models may be created and executed simultaneously or in any sequence desired.

In this embodiment, the method 300A includes, at block 302, defining an entity (e.g., company, individual, product, etc.) to be resolved. As shown in FIG. 4, by way of example, the entity to be resolved is the identification of an individual (e.g., via a social network user identifier and a customer identifier), and is reflected at 402 in the algorithm 400 of FIG. 4. At block 304, the method 300A includes selecting two datasets for comparison. Using the example depicted in FIG. 1, one of the datasets may be the social network user profile 112 and activity data 114 (dataset 110) and the other dataset is the customer database 120. In addition, as shown in FIG. 4, in addition to the datasets selected 404, geo-location clues (e.g., from the social media activity data) may be captured (shown as 'T.geos geoTag' in FIG. 4).

At block 306, the method 300A includes defining matching predicates for attributes of the datasets, which will select a set of candidate matches. Any number of matching predicates may be defined as desired. By way of illustration, the algorithm 400 of FIG. 4 lists four different matching predicates 406 for the model: last name of entity, last name frequency, first name match, and geo-location of entity. As can be seen from the matching predicates 406, the model exploits demographic statistics to improve precision. For example, the process can check census information for a last name to determine the frequency of occurrence (prevalence) of the name with respect to a particular geography. The matching predicate on the last name lastNameFrequency-Filter (C.lastName, 20) filters out records with frequent last names, in this case discarding records with last names in the top 20 percent by frequency of occurrence. In addition, the matching predicate 'isGeoNearZipCode(geoTag, C.zipGeo, 5) looks at the geographic coordinates, if available, of the entity based on data from the social media data and determines if this location is within five miles of the zipcode identified for the customer in the customer database in determining a match.

At block 308, the method 300A includes defining one or more precedence rules that select a subset of the candidate matches. The algorithm 400 of FIG. 4 provides the ability to set a higher value on certain results that are determined to strongly indicate identity. As shown by way of example in FIG. 4, the precedence rule 408 is used by the model to retain results in which there is found a match between an entity's (i.e., customer's) email and a social media network identifier of the entity.

At block 310, the method 300A includes running the deterministic model on the two datasets. The model applies the matching predicates and precedence rule(s) to data in the datasets that correspond to the attributes.

At block 312, the method 300A includes applying a cardinality rule to results of running the deterministic model. As shown in FIG. 4, a rule 410 indicates that the relationship of data under comparison must be one-to-one. Thus, the cardinality is 1:1.

At block 314, the method 300A includes determining whether the cardinality rule is satisfied with respect to the candidate matches. Candidate matches that do not satisfy the cardinality rule are discarded in block 316, while those candidate matches that do satisfy the cardinality rule are output by the process in block 318.

The entity resolution processes provide an iterative procedure by which users may refine entity resolution rules. As part of an iterative entity resolution design/execution flow, a user may re-define matching predicates, precedence rules, and/or cardinality rules to improve the results of the model. Iterating through the process may be implemented by a user after evaluating the quality of the results of the previous iteration. Thus, as shown in FIG. 3A, if the quality of the results is less than a threshold$_{[A1]}$, at block 320, the method 300A includes re-defining the matching predicates at block 322, e.g., at a lower granularity. The method 300A returns to block 308 in a nested fashion. Otherwise, if the results are greater than or equal to the threshold, the process continues in FIG. 3B.

Turning to FIG. 3B, at block 324, the method 300B includes selecting records from two datasets for comparison.

At block 326, the method 300B includes implementing data derivation on the records. As shown in the algorithm 500 of FIG. 5, by way of example, for a record 'r,' a deriveData(r) instruction 502 causes the algorithm 500 to implement the data derivation on the record. This process causes the data to be standardized or formatted and placed into buckets.

At block 328, the method 300B includes defining blocking conditions for application to the bucketed data. The blocking conditions reflect constraints to be applied to the data buckets and are reflected in FIG. 5 at 504.

At block 330, the method 300B includes running the probabilistic model on the bucketed data.

At block 332, the method 300B includes scoring results of pairwise comparisons of the bucketed data. The scoring is illustrated in FIG. 5 at 506.

At block 334, the method 300B includes combining results of the pairwise comparisons with results of the deterministic model.

Figure 6:
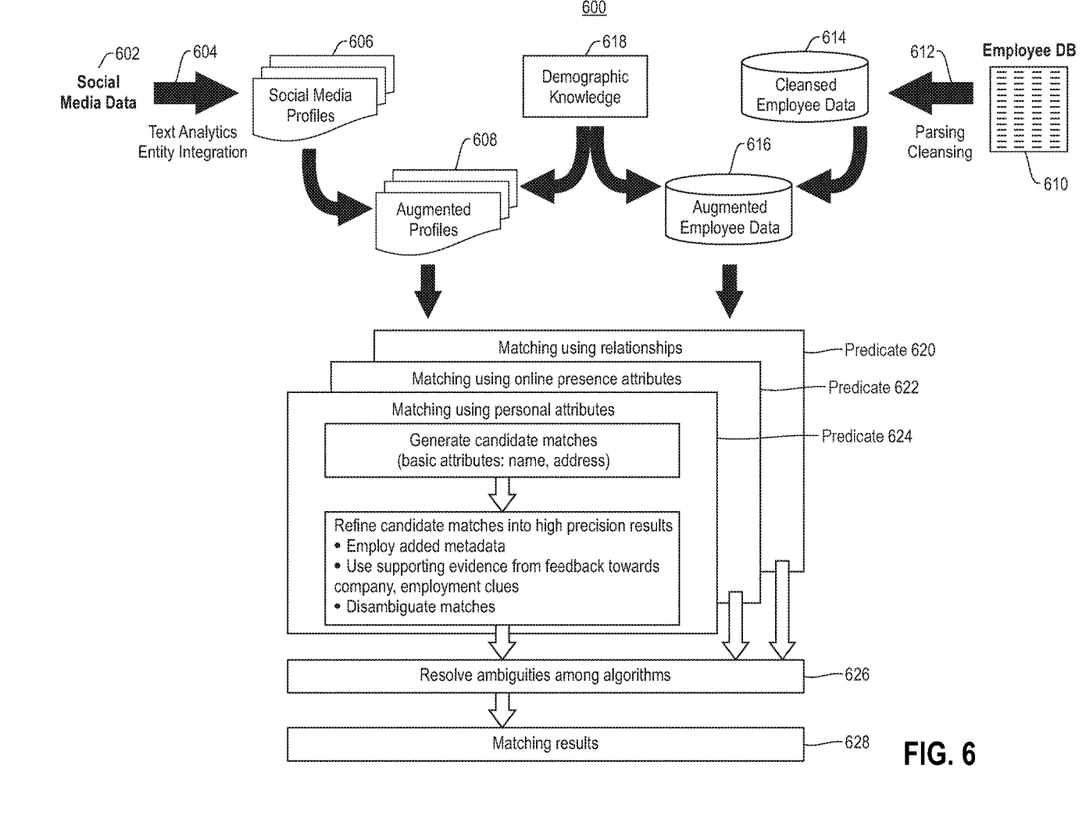
FIG. 6 depicts a sample application for entity resolution between non-traditional datasets in accordance with an embodiment.

Turning now to FIG. 6, an application 600 of the entity resolution process will now be described. FIG. 6 illustrates two selected datasets, social media data 602 and employee database 610. Text analytics and entity integration 604 is performed on the social media data 602 and, in conjunction with social media profiles 606 (e.g., profile 110), the profiles 606 are modified to incorporate the results of the analytics and entity integration. Demographic knowledge 618 (e.g., geo-location of the entity subject to a profile) is determined and applied to the modified social media profiles 606 to produce augmented profiles 608.

The employee database 610 is parsed and cleansed 612 and stored in a database 614. This processed data in database 614 is augmented with demographic knowledge 618 to produce augmented employee database 616.

One or more matching predicates can be defined for the resulting data, as shown by way of illustration in FIG. 6, as predicates 620, 622, and 624, respectively. These predicates are each implemented as an algorithm. Results of the three algorithms are disambiguated 626 to produce any matches in the results 628.

Figure 7:
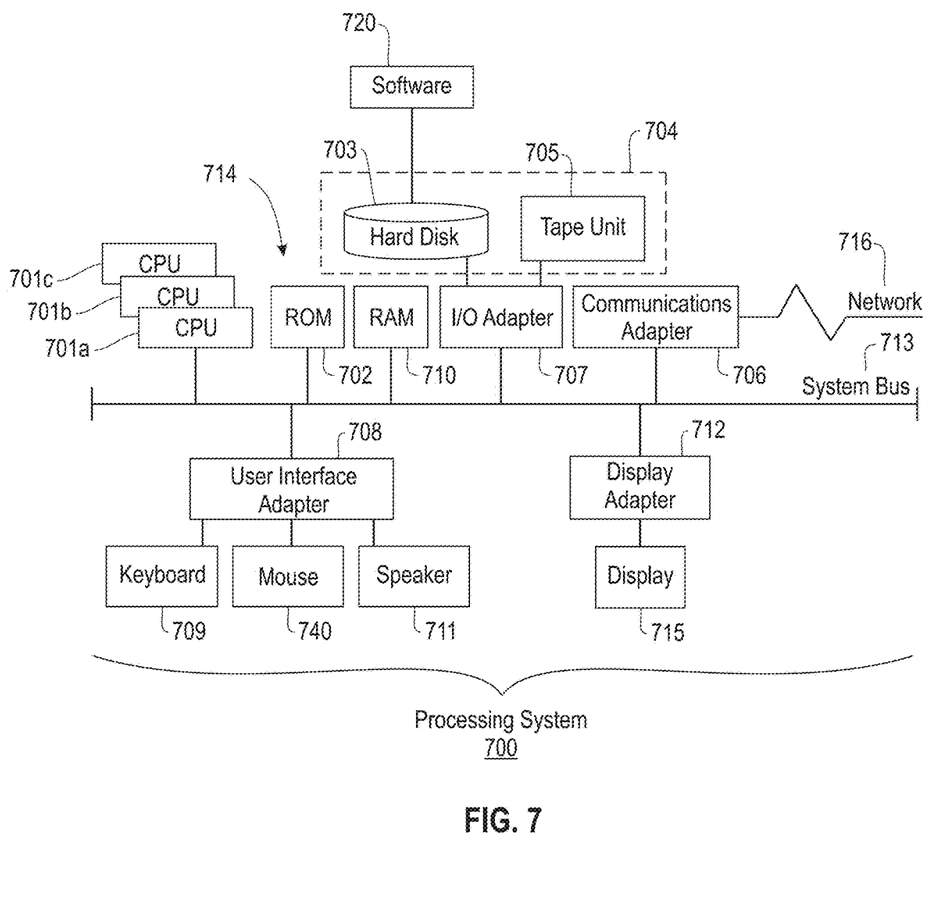
FIG. 7 depicts a processing system for entity resolution between non-traditional datasets in accordance with an embodiment.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701). Processors 701 are coupled to system memory 714 and various other components via a system bus 713. Read only memory (ROM) 702 is coupled to system bus 713 and may include a basic input/output system (BIOS), which controls certain basic functions of the processing system 700. The system memory 714 can include ROM 702 and random access memory (RAM) 710, which is read-write memory coupled to system bus 713 for use by processors 701.

FIG. 7 further depicts an input/output (I/O) adapter 707 and a network adapter 706 coupled to the system bus 713. I/O adapter 707 may be a small computer system interface (SCSI) adapter that communicates with a hard disk 703 and/or tape storage drive 705 or any other similar component. I/O adapter 707, hard disk 703, and tape storage drive 705 are collectively referred to herein as mass storage 704. Software 720 for execution on processing system 700 may be stored in mass storage 704. Network adapter 706 interconnects system bus 713 with an outside network 716 enabling processing system 700 to communicate with other such systems. A screen (e.g., a display monitor) 715 is connected to system bus 713 by display adapter 712, which may include a graphics controller to improve the performance of graphics intensive applications and a video controller. In one embodiment, adapters 707, 706, and 712 may be connected to one or more I/O buses that are connected to system bus 713 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 713 via user interface adapter 708 and display adapter 712. A keyboard 709, mouse 740, and speaker 711 can be interconnected to system bus 713 via user interface adapter 708, which may include, for example, a Super I/O chip integrating multiple device adapters into a single integrated circuit.

Thus, as configured in FIG. 7, processing system 700 includes processing capability in the form of processors 701, and, storage capability including system memory 714 and mass storage 704, input means such as keyboard 709 and mouse 740, and output capability including speaker 711 and display 715. In one embodiment, a portion of system memory 714 and mass storage 704 collectively store an operating system such as the AIX® operating system from IBM Corporation to coordinate the functions of the various components shown in FIG. 7.

Technical effects and benefits include the ability to provide entity resolution between traditional and non-traditional datasets, as well as between non-traditional datasets. The entity resolution processes utilize multiple algorithms, each using different subsets of available attributes, and each implemented using either deterministic or probabilistic techniques. The combination of multiple techniques, in conjunction with disambiguation methods (e.g., enforcing 1:1 constraints), can lead to increased accuracy and recall.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for entity resolution between traditional and non-traditional datasets, the method comprising:
creating, via a computer processor, a deterministic model, the creating comprising:
defining an entity to be resolved;
selecting two datasets for comparison, wherein a first of the two datasets is a traditional database comprising structured or semi-structured data records, wherein a second of the two datasets is a non-traditional database comprising unstructured data records;
defining matching predicates for attributes of the two datasets to select a set of candidate matches; and
defining at least one precedence rule for the candidate matches to select a subset of the candidate matches;
running, via the computer processor, the deterministic model on the two datasets, the running comprising applying the matching predicates and the at least one precedence rule to data in the two datasets that correspond to the attributes;
applying a cardinality rule to results of the running;
outputting, via the computer processor, the matching candidates for which the cardinality rule is satisfied;
creating a probabilistic model, comprising:
selecting records from the two datasets for comparison;
implementing data derivation on the records, the data derivation resulting in standardized and bucketed data;
defining blocking conditions for application to each of corresponding bucketed data; and
defining a scoring rule for pairwise comparisons of the bucketed data;
running the probabilistic model on the bucketed data;

scoring results of the pairwise comparisons of the bucketed data; and
combining the results of the deterministic model with the results of the probabilistic model.

2. The method of claim 1, further comprising:
upon determining that quality of the outputted matches falls below a threshold value, iteratively modifying at least one of the matching predicates, the at least one precedence rule, and the cardinality rule and running the deterministic model until the quality of the results meet or exceed the threshold value.

3. The method of claim 1, wherein the modifying includes at least one of:
re-defining at least one of the attributes of one of the matching predicates at a coarser granularity to produce a greater number of the candidate matches;
re-defining at least one of the matching predicates at a finer granularity to produce fewer of the candidate matches; and
re-defining at least one of the at least one precedence rules to reduce a number of candidate matches that violate cardinality constraints.

4. The method of claim 1, wherein the attributes include geo-location indicators of a physical location of the entity.

5. The method of claim 4, wherein the geo-location indicators reflect geographic coordinates of a current and temporary location of the entity that are retrieved from social media activity derived from one of the two datasets.

6. The method of claim 1, wherein the attributes include online presence indicators with respect to the entity.

7. The method of claim 1, wherein the attributes indicate purchase intent history of the entity.

8. The method of claim 1, wherein one of the matching predicates checks that a frequency of occurrence of an attribute value falls below a specified value.

9. The method of claim 1, wherein one of the at least one precedence rules gives higher precedence to candidate matches that satisfy a matching condition applied to at least one of social network handles, email addresses, telephone numbers, social security numbers, and driver license numbers.

10. A computer program product for entity resolution between traditional and non-traditional datasets, the computer program product comprising a computer readable storage medium having program instructions embodied therewith, the program instructions executable by a processor to cause the processor to:
create a deterministic model, comprising:
defining an entity to be resolved;
selecting two datasets for comparison, wherein a first of the two datasets is a traditional database comprising structured or semi-structured data, wherein a second of the two datasets is a non-traditional database comprising unstructured data;
defining matching predicates for attributes of the two datasets to select a set of candidate matches; and
defining at least one precedence rule for the candidate matches to select a subset of the candidate matches;
run the deterministic model on the two datasets, the running comprising applying the matching predicates and the at least one precedence rule to data in the two datasets that correspond to the attributes;
apply a cardinality rule to results of the running;
output, via the processor, the matching candidates for which the cardinality rule is satisfied;

create a probabilistic model, comprising:
selecting records from the two datasets for comparison;
implementing data derivation on the records, the data derivation resulting in standardized and bucketed data;
defining blocking conditions for application to each of corresponding bucketed data; and
defining a scoring rule for pairwise comparisons of the bucketed data;
run the probabilistic model on the bucketed data;
score results of the pairwise comparisons of the bucketed data; and
combine the results of the deterministic model with the results of the probabilistic model.

11. The computer program product of claim 10, wherein the program instructions further cause the processor to:
upon determining that quality of the outputted matches falls below a threshold value, iteratively modify at least one of the matching predicates, the at least one precedence rule, and the cardinality rule and run the deterministic model until the quality of the results meets or exceeds the threshold value;
wherein modification of at least one of the matching predicates includes at least one of:
re-defining at least one of the attributes of one of the matching predicates at a coarser granularity to produce a greater number of the candidate matches;
re-defining at least one of the matching predicates at a finer granularity to produce fewer of the candidate matches; and
re-defining at least one of the at least one precedence rule to reduce a number of candidate matches that violate cardinality constraints.

12. The computer program product of claim 10, wherein the attributes include geo-location indicators of a physical location of the entity;
wherein the geo-location indicators reflect geographic coordinates of a current and temporary location of the entity that are retrieved from social media activity derived from one of the two datasets.

13. The computer program product of claim 10, wherein the attributes include online presence indicators with respect to the entity.

14. The computer program product of claim 10, wherein the attributes indicate purchase intent history of the entity.

15. The computer program product of claim 10, wherein one of the at least one precedence rule gives higher precedence to candidate matches that satisfy a matching condition applied to at least one of social network handles, email addresses, telephone numbers, social security numbers, and driver license numbers.

16. A system for entity resolution between traditional and non-traditional datasets, the system comprising:
a memory having computer readable computer instructions; and
a processor for executing the computer readable instructions, the computer readable instructions including:
creating a deterministic model, comprising:
defining an entity to be resolved;
selecting two datasets for comparison, wherein a first of the two datasets is a traditional database comprising structured or semi-structured data records, wherein a second of the two datasets is a non-traditional database comprising unstructured data records;
defining matching predicates for attributes of the two datasets to select a set of candidate matches; and defining at least one precedence rule for the candidate matches to select a subset of the candidate matches;
running the deterministic model on the two datasets, the running comprising applying the matching predicates and the at least one precedence rule to data in the two datasets that correspond to the attributes;
applying a cardinality rule to results of the running;
outputting, via the processor, the matching candidates for which the cardinality rule is satisfied;
creating a probabilistic model, comprising:
  selecting records from the two datasets for comparison;
  implementing data derivation on the records, the data derivation resulting in standardized and bucketed data bucketed data; and
  defining a scoring rule for pairwise comparisons of the bucketed data;
running the probabilistic model on the bucketed data;
scoring results of the pairwise comparisons of the bucketed data; and
combining the results of the deterministic model with the results of the probabilistic model.

17. The system of claim 16, wherein the attributes include geo-location indicators of a physical location of the entity; wherein the geo-location indicators reflect geographic coordinates of a current and temporary location of the entity that are retrieved from social media activity derived from one of the two datasets.

* * * * *